United States Patent
Hirs

(10) Patent No.: US 7,083,736 B1
(45) Date of Patent: Aug. 1, 2006

(54) OIL SEPARATOR

(76) Inventor: Gene Hirs, 340 Orange Tree Dr., Apt. #5, Atlantis, FL (US) 33462-1341

( * ) Notice: Subject to any disclaimer, the term of this patent is extended or adjusted under 35 U.S.C. 154(b) by 0 days.

(21) Appl. No.: 11/049,498

(22) Filed: Feb. 2, 2005

(51) Int. Cl.
  *B01D 17/25* (2006.01)
(52) U.S. Cl. ............ 210/800; 210/521; 210/539; 210/540; 210/533; 210/DIG. 5
(58) Field of Classification Search ........ 210/800, 210/801, 802, 521, 522, 532.1, 533, 538, 210/540, 539, DIG. 5
  See application file for complete search history.

(56) References Cited

U.S. PATENT DOCUMENTS

| | | | | |
|---|---|---|---|---|
| 1,085,135 A | * | 1/1914 | Kelly, Jr. | 210/540 |
| 1,170,558 A | * | 2/1916 | Nonnenbruch | 210/800 |
| 3,710,949 A | * | 1/1973 | Murkes | 210/522 |
| 3,948,768 A | * | 4/1976 | Chapman | 210/DIG. 5 |
| 4,202,778 A | * | 5/1980 | Middelbeek | 210/532.1 |
| 4,554,074 A | * | 11/1985 | Broughton | 210/540 |
| 4,804,471 A | * | 2/1989 | Velisavljevic | 210/540 |
| 5,006,260 A | * | 4/1991 | Roques et al. | 210/DIG. 5 |
| 5,368,747 A | * | 11/1994 | Rymal et al. | 210/800 |
| 5,874,008 A | * | 2/1999 | Hirs | 210/DIG. 5 |
| 6,200,490 B1 | * | 3/2001 | Hirs | 210/540 |
| 6,379,567 B1 | * | 4/2002 | Crites | 210/532.1 |

* cited by examiner

*Primary Examiner*—Christopher Upton
(74) *Attorney, Agent, or Firm*—L. C. Begin & Associates, PLLC

(57) ABSTRACT

A system for extracting free oil from industrial processing fluids contains a solids retention cartridge having a plurality of vertically oriented polymeric elements therein. The cartridge fluidly communicates with a retention chamber, wherein the retention chamber provides a predetermined residence time based on fluid flow as established by inlet and outlet pressure and also as established by valved fluid exit orifices. An aggregation chamber fluidly communicates with the retention chamber and provides an area for aggregation of a low density fluid such as oil for example. The low density fluid is then decanted from a decant chamber. The purified bulk fluid is drained from the retention chamber through an associated return chamber. The average cross-sectional area of the aggregation chamber is less than the average cross-sectional area of the retention chamber thereby enhancing the aggregation of a lower density fluid such as oil, prior to decant.

10 Claims, 2 Drawing Sheets

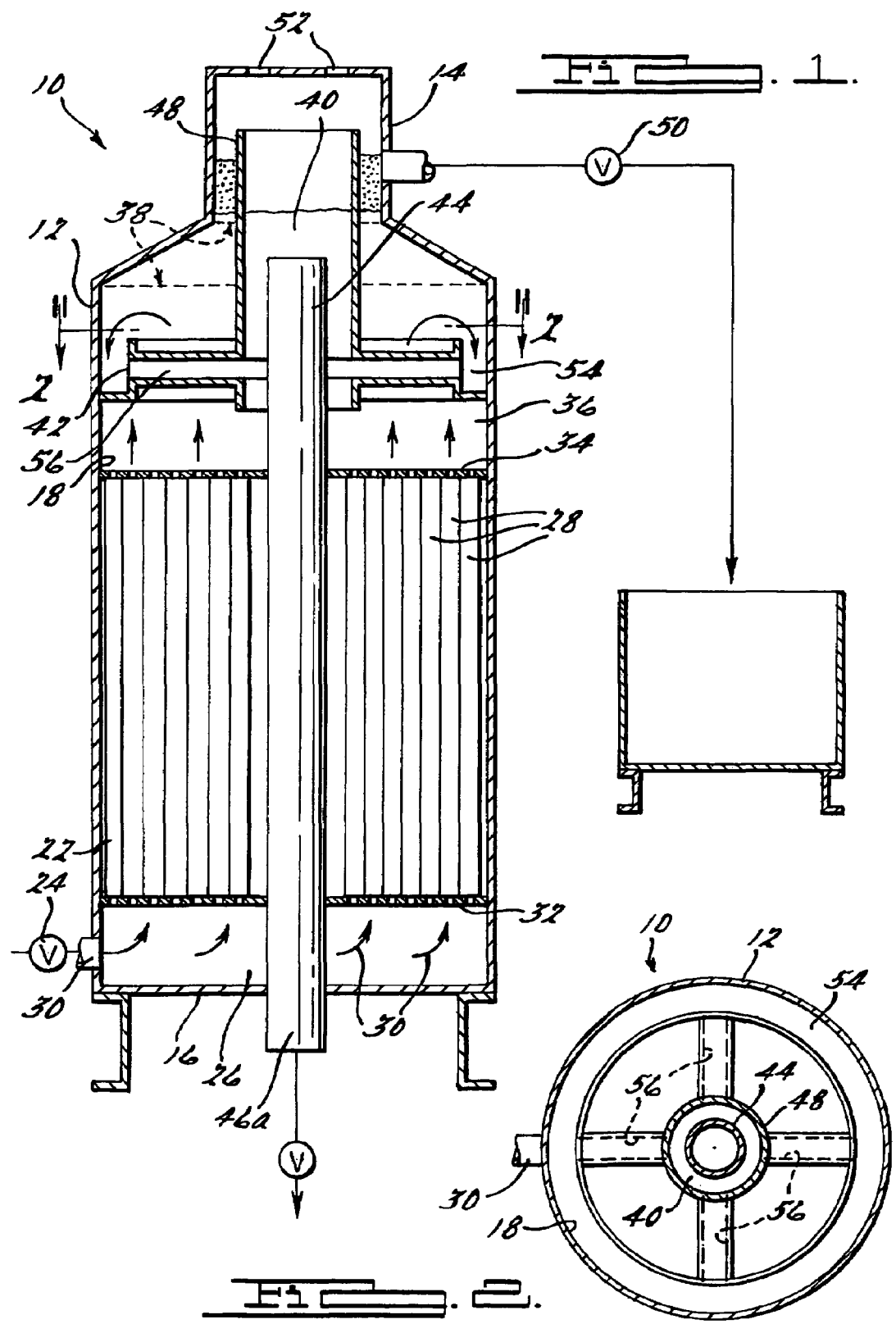

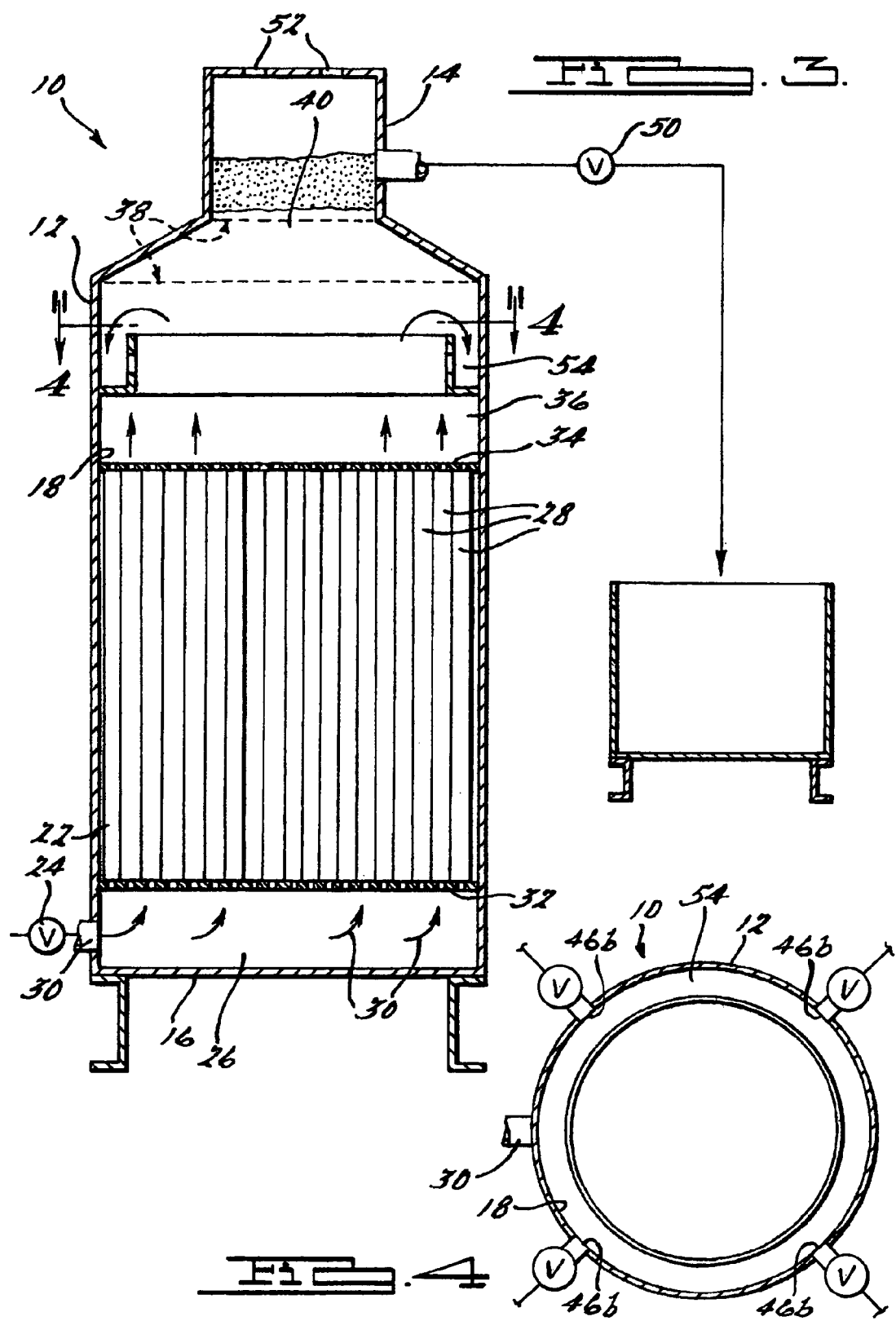

OIL SEPARATOR

BACKGROUND OF THE INVENTION

The present invention relates generally to liquid purification systems and more particularly to a system for removing free oil, calcium soaps, reverse phase emulsions, bacterial by-products, and/or oxidizer particulates and/or other contaminants from aqueous fluid mixtures utilized in industrial machining applications. It is believed that these contaminants contribute to the blinding or plugging of various filters employed in the coolant system, cartridge filters for example.

Industrial machining operations generally require the use of coolants to lubricate and cool tools to prevent damage thereof due to excessive heat. Typically, a coolant comprises an oil-in-water emulsion or an aqueous mixture wherein water is the continuous phase, oil is the disperse phase, and soap is the emulsifying agent.

The emulsion is stabilized by electromechanical forces which are weakened or destroyed by contaminants in the form of metallic ions, free oil and bacterial action. The primary culprit in coolant deterioration is free or "tramp" oil which not only attracts the undesirable contaminants and abrasive colloidal solids, must be removed to maintain the stability and equilibrium of the emulsion. Moreover, abrasive colloidal solids, often found suspended in the emulsion, cause a decline in the quality of the coolant and blockages in coolant filters.

SUMMARY OF THE INVENTION

The aforesaid problems are solved, in accordance with a preferred constructed embodiment of the present invention, by an oil or fluid separator that removes free oil (tramp oil) or low density fluid from an aqueous oil-in-water emulsion or other mixture, respectively. The fluid separator is placed downstream of the machining process or other process to accept the contaminated fluid produced during the machining operation. The preferred embodiment contemplates the use of the oil separator in association with a bulk aqueous fluid containing tramp oil. The present invention may in fact be utilized with any bulk fluid containing at least two liquids with different densities, where separation of the two is desired.

The oil separator of the present invention contains a housing having a first and a second end for containment of other constituents of the separator. A bulk fluid inlet communicates with the interior of the housing. An inner wall is defined by the housing and defines several chambers described below. A distribution chamber is contained within the housing and fluidly communicates with the bulk fluid inlet. A plurality of vertically oriented polymeric elements fluidly communicates with the distribution chamber for coalescence of contaminants entrained within the bulk fluid. In a coolant application, oleophilic surface attraction between the polymeric elements and oil covered solids in the bulk coolant attracts and binds the oil-covered solids to the walls of the vertically oriented elements where coalescence or aggregation of tramp oil occurs. In operation, bulk fluid enters at a first end of the plurality of polymeric elements and exits at a second end of the plurality of elements.

A retention chamber is contained within the housing and fluidly communicates with the second end or fluid exit of the plurality of polymeric elements, for retention of bulk fluid and for phase separation of liquids of different densities. The cross-sectional area of the retention chamber is progressively reduced from the second end of the polymeric elements towards the second end of the housing, thereby enhancing the aggregation or coalescence of oil or any other less dense fluid within the bulk fluid.

A return chamber is also contained within the housing and fluidly communicates with the retention chamber. Bulk fluid is returned after a period of retention within the retention chamber. At least one return port defines the inlet to the return chamber and is positioned within the retention chamber wherein bulk fluid is essentially drained to a lower point in the housing. A return conduit contained within the return chamber functions as a purified bulk fluid drain. A bulk fluid outlet is gravitationally positioned within the housing to provide gravitational release of the bulk fluid. The bulk fluid is then returned back to the main system.

An aggregation chamber is located proximate to the smallest cross-sectional area of the retention chamber and fluidly communicates therewith, wherein oil globules or any other relatively less dense fluid is concentrated and then valved to waste. A decant valve or outlet fluidly communicates with the aggregation chamber and may be continuously opened or may be opened based on timed intervals, for example. A vent to atmosphere is provided in the aggregation chamber thereby venting the separation system or housing and facilitating the return of the bulk fluid without the creation of a siphon or vacuum.

By adjusting a fluid inlet valve that controls coolant flow into the inlet plenum or distribution chamber, coolant flow through the separator may be limited such that the total fluid flow through the secondary settling chamber is five to ten percent of the total flow through the entire system. This flow limitation allows for maximum efficiency in waste oil separation and decanting. Furthermore, the use of flow-limited multistage gravitational separation eliminates the necessity of employing a surface skimmer to remove waste oil from the surface of the aqueous mixture. Known in the art surface skimmers often suffer from the disadvantage that they remove large quantities of coolant mixture from the system, in addition to surface resident waste oil, thereby providing for inefficient oil separation.

One embodiment of the present invention may therefore be considered a liquid treatment system for a bulk fluid. The system contains a housing comprising an inlet and an outlet, and a bottom end and a top end. An inner wall is defined by the housing, wherein the inner wall defines an interior of the housing. A solids retention cartridge comprising a plurality of vertically oriented spaced polymeric elements (preferably tubes), has a top end, and a bottom end wherein the plurality of vertically oriented polymeric elements fluidly communicates with an inlet/inlet chamber at the bottom end of the cartridge. A retention chamber is contained within the housing and has an average cross-sectional area. A portion or aggregation chamber defined within the retention chamber has a decreasing cross-sectional area as the chamber is defined from a bottom end to a top end, thereby assisting in the agglomeration of oil from an aqueous-based fluid for example. The retention chamber fluidly communicates with the vertically oriented polymeric elements at the top end of the cartridge, wherein bulk fluid flows through said cartridge and into said retention chamber thereby facilitating separation of a plurality of fluids from said bulk fluid based on a difference in relative densities of each of said plurality of fluids. A bulk fluid release weir may be formed about the inner wall of the retention chamber for release of the bulk fluid.

In accordance with the present invention, the aggregation chamber within the housing has an average cross-sectional area wherein the aggregation chamber in fluidly communicates with the retention chamber wherein the aggregation chamber coalesces or agglomerates at least one of said plurality of fluids having a relatively lower density than the bulk fluid. An oil or coalesced fluid outlet fluidly communicates with the aggregation chamber for discharge of the coalesced fluid such as oil. A return chamber contains a return plenum formed between the weir and the inner wall, wherein the return chamber fluidly communicates with the housing outlet.

During operation of the liquid treatment system a bulk fluid such as aqueous-based coolant is introduced through the inlet, then into the inlet chamber. It then is directed upwardly through the solids retention cartridge or polymeric tubes for retention of solids within the bulk fluid. The fluid is then directed into the retention chamber for a predetermined residence time whereby the aggregated fluid having a relatively lower density, tramp oil for example, is concentrated within the aggregation chamber. The tramp oil or waste fluid is then drained through a decant chamber through the low density fluid outlet, and, the bulk fluid is drained from the return chamber.

In sum, one object of the instant invention is to provide an oil separator that maximizes the collection and decantation of a greater concentration of waste oil than known oil separators.

A further object of the present invention is to provide an oil separator that decants waste oil without employing inefficient surface skimmers.

These and other benefits of the invention will be apparent from the following description.

BRIEF DESCRIPTION OF THE DRAWINGS

FIG. 1 is a sectional view of a preferred constructed embodiment of the present invention;

FIG. 2 is a sectional view of the preferred embodiment of FIG. 1, taken along the line 2—2;

FIG. 3 is a sectional view of an alternative embodiment of the present invention; and FIG. 4 is a sectional view of the embodiment of FIG. 3, taken along the line 4—4.

DETAILED DESCRIPTION OF THE PREFERRED EMBODIMENT

As shown in FIGS. 1 and 2, a system 10 for separating oil from an aqueous fluid mixture, such as an industrial coolant emulsion for a machining process, includes a housing 12 having a first or top end 14 and a second or bottom end 16. An inner wall 18 constitutes an inner periphery of the housing 12. The separating system of the present invention includes an oil-coalescing cartridge 20 that is especially suited for acceptance of an industrial aqueous-based fluid that typically includes oil and oil-covered fines or solids. A bulk fluid inlet 22 is preferably provided with an inlet valve 24 which may be utilized to adjust the total fluid flow into the separator or system 10. An inlet plenum or distribution chamber 26 within the housing 12 and proximate bottom end 16, fluidly communicates with the bulk fluid inlet 22. The solids or fines coalescing cartridge 20 contains a plurality of vertically oriented polymeric elements 28 positioned within the housing 12 such that the entering fluid flows upwardly from the inlet plenum 26 and through the cartridge 20. As the fluid 30 flows upwardly, tramp oil-covered particles adhere and aggregate along the surface of the vertical polymeric elements 28 thereby reducing the contaminant load within the bulk fluid 30. In a preferred constructed embodiment of the present invention the oil coalescing cartridge 20 is comprised of a plurality of spaced polymeric elements 28, for example high-density polyethylene tubes 4 to 5 feet in length, arranged vertically within the housing 12.

The cartridge 20, or the polymeric elements 28 collectively, has a first or top end 32 and a second or top end 34. In operation, bulk fluid 30 enters at the first end 32 of the plurality of polymeric elements 28 and exits at a second end 34 of the plurality of elements 28. A retention or settling chamber 36, proximate the second end 34 of the cartridge 20, fluidly communicates with the polymeric elements 28. The bulk fluid 30 then resides within the retention chamber 36 for a predetermined amount of time, particularly dependent on the amount of fluid permitted past inlet valve 24. While in the retention chamber 36, the aqueous solution, water, and oil present in the aqueous-based bulk fluid 30 separates into respective phases. The cross-sectional area 38 of the retention chamber 36 is progressively reduced from the second end 34 of the polymeric elements 28 towards the top end 14 of the housing 12, thereby enhancing and facilitating the aggregation or coalescence of oil or any other less dense fluid within the bulk fluid 30. In a preferred embodiment, the retention chamber 36 is conically structured for at least a portion of the total retention chamber 36. Accordingly, the overall housing 12 is preferably either cylindrical or conical in shape and therefore defines variable circumferences about the inner wall 18.

A return chamber 40 is also contained within the housing 12 and fluidly communicates with the retention chamber 36, whereby bulk fluid is returned after a period of retention within the retention chamber 36. At least one return port 42 defines the inlet to the return chamber 40 and is positioned within the retention chamber 36 wherein bulk fluid 30 is essentially drained to a lower point in the housing 12. A return conduit 44 contained within the return chamber 40 functions as a bulk fluid drain. A bulk fluid outlet 46a is gravitationally positioned within the housing 12 to provide gravitational release of the bulk fluid 30. The bulk fluid 30 is then returned back to the main system 10.

An aggregation chamber 48 is located proximate to the smallest cross-sectional area of the retention chamber 36 and fluidly communicates therewith, wherein oil globules or any other relatively less dense fluid is concentrated and then valved to waste. A second outlet or waste fluid decant valve 50 fluidly communicates with the aggregation chamber 48 and may be continuously opened or may be opened based on timed intervals, for example. A vent 52 to atmosphere is preferably provided in the 48 aggregation chamber thereby venting the separation system 10 or housing 12 and facilitating the return of the bulk fluid 30 without the creation of a siphon or vacuum.

In yet another aspect of the invention, an annular weir 54 is preferably formed about the inner wall 18 of the periphery of the retention chamber. As shown in the figures, the bulk fluid 30 may be channeled back to the core return chamber 40 or return conduit 44 through a plurality of radially extending channels 56, and then drained through the return chamber 40 to a bottom-most drain in the housing.

Or, in another embodiment, shown in FIGS. 3 and 4, the purified fluid 30 may be drained to the bulk fluid system through at least one and if desired, a plurality of bulk fluid exit orifices 46b formed in the housing 12 adjacent the annular weir 54. As fluid is introduced to the retention chamber 40, fluid then flows over the annular weir 54 and is discharged immediately through the plurality of fluid exit orifices 46b in the housing. Or, in yet another embodiment, the fluid may be channeled from the annular weir 54 to the core return chamber 40 for discharge to the system.

Or, in yet another embodiment (not shown), the purified fluid 30 may be drained down at least one axial conduit or channel 58 formed between the inner wall 18 and the cartridge 20, and then directed in an axially opposite direction through a second annular axial channel 60 toward the top end 14. The annular axial channel 60 fluidly communicates with the return chamber 40 whereby the bulk fluid 30 is finally directed in an axially opposite direction toward the bottom end 16 and out at least one bulk fluid outlet 46c.

In sum, the present invention may be generically described as a liquid treatment system for a bulk fluid system comprising a bulk fluid having a relatively greater density and at least one second fluid having a relatively lesser density. The liquid treatment system contains a housing including a top end and a bottom end; a bulk fluid inlet in fluid communication with the housing for introduction of a bulk fluid to the system; a plurality of polymeric elements vertically oriented in the housing and fluidly communicating with the bulk fluid inlet wherein the bulk fluid passes through the plurality of polymeric elements for aggregation of fines and solids; a retention chamber for retention of the bulk fluid, the retention chamber at least partially formed as a conical section wherein a cross-sectional area of the retention chamber is decreased toward the top end thereby facilitating aggregation of the second fluid having a relatively lesser density fluid, wherein bulk fluid flows from the plurality of polymeric elements into the retention chamber; and a return chamber in fluid communication with the retention chamber, wherein the return chamber contains at least one bulk fluid outlet.

Benefits attendant to the present system 10 include maximized tramp oil removal, simplified assembly of the oil separator 10, and/or reduction and/or elimination of electronic controls attendant to the oil separation process.

Although the preferred embodiments of the instant invention have been disclosed in detail, it will be appreciated by one of ordinary skill in the art that the various structural and operational features herein disclosed are susceptible to modification without departing from the scope of the following claims.

What is claimed is:

1. A system for separating oil from an aqueous-based fluid, said system comprising:
   a housing comprising a top end and a bottom end;
   a bulk fluid inlet in fluid communication with said housing at said bottom end for introduction of a bulk fluid to said system;
   a plurality of polymeric tubes vertically oriented in said housing and fluidly communicating with said bulk fluid inlet wherein said bulk fluid passes through said plurality of polymeric tubes for aggregation of contaminants;
   a retention chamber positioned within said housing and in fluid communication with said plurality of polymeric tubes for retention of said aqueous-based fluid, said retention chamber having a cross-sectional area decreasing in size toward said top end thereby facilitating aggregation of oil, wherein aqueous-based fluid flows from said plurality of polymeric tubes into said retention chamber;
   a return chamber in fluid communication with said retention chamber, wherein said return chamber comprises at least one fluid outlet;
   a weir formed within the housing and about the retention chamber, said weir in fluid communication with said return chamber; and
   a central plenum formed within said return chamber, said central plenum in fluid communication with said weir and said retention chamber,
   wherein aqueous-based fluid flows from the retention chamber over the weir and into the return chamber, then into and through the central plenum and then through said outlet.

2. The system of claim 1 wherein said return chamber further comprises:
   at least one fluid conduit in fluid communication with said central plenum; and
   a drainage chamber in fluid communication with said at least one fluid conduit, said drainage chamber in fluid communication with said bulk fluid outlet.

3. The system of claim 1 further comprising a vent in the housing for preventing a vacuum within the housing.

4. A method of separating tramp oil from an aqueous-based fluid, the method comprising the steps of:
   forming a housing having a retention chamber formed within the housing, wherein the retention chamber is at least partially formed to have a narrowing section having a reduction in cross-sectional area from a bottom end to a top end;
   positioning a plurality of vertically oriented polymeric elements within the housing and in fluid communication with the retention chamber;
   providing an inlet of the housing in fluid communication with the plurality of polymeric elements;
   providing a return chamber in fluid communication with said retention chamber, wherein said return chamber comprises at least one fluid outlet;
   providing a weir within the housing, said weir extending about the retention chamber, said weir in fluid communication with said return chamber;
   providing a central plenum formed within said return chamber, said central plenum in fluid communication with said weir and said retention chamber,
   introducing an aqueous-based fluid to the inlet of the housing;
   passing the aqueous-based fluid through the plurality of polymeric elements;
   directing the aqueous-based fluid into the retention chamber for coalescence of tramp oil; and
   coalescing the tramp oil within the narrowing portion of the retention chamber.

5. The method of claim 4 further comprising the steps of:
   discharging the bulk fluid from the retention chamber through at least one bulk fluid outlet in fluid communication therewith; and
   discharging the coalesced tramp oil from the housing.

6. The method of claim 5 wherein the step of discharging the bulk fluid from the retention chamber comprises the step of directing the fluid from the retention chamber over the weir and into the return chamber, then into and through the central plenum and then through said bulk fluid outlet.

7. A system for separating oil from an aqueous based fluid, said system comprising:
   a housing comprising a top end and a bottom end;
   a bulk fluid inlet in fluid communication with said housing at said bottom end for introduction of a bulk fluid to said system;
   a plurality of polymeric tubes vertically oriented in said housing and fluidly communicating with said bulk fluid inlet wherein said bulk fluid passes through said plurality of polymeric tubes for aggregation of contaminants;

a retention chamber positioned within said housing and in fluid communication with said plurality of polymeric tubes for retention of said aqueous-based fluid, said retention chamber having a cross-sectional area decreasing in size toward said top end thereby facilitating aggregation of oil wherein aqueous-based fluid flows from said plurality of polymeric tubes into said retention chamber;

a return chamber in fluid communication with said retention chamber, wherein said return chamber includes at least one fluid outlet, a weir formed within said housing and about said retention chamber for return of the bulk fluid, and at least one fluid exit orifice formed in said housing adjacent said weir, wherein bulk fluid is discharged from said housing through said at least one fluid exit orifice.

8. The system of claim 7 wherein said return chamber further comprises a plurality of fluid exit orifices.

9. The system of claim 8 wherein said return chamber further comprises a plurality of valves, each one of said plurality of valves corresponding to a respective fluid exit orifice of said plurality of fluid exit orifices, wherein said valves provide a variable flow rate.

10. The system of claim 7 wherein said at least one fluid exit orifice is valved to provide a variable discharge rate.

* * * * *